Patented Mar. 21, 1944

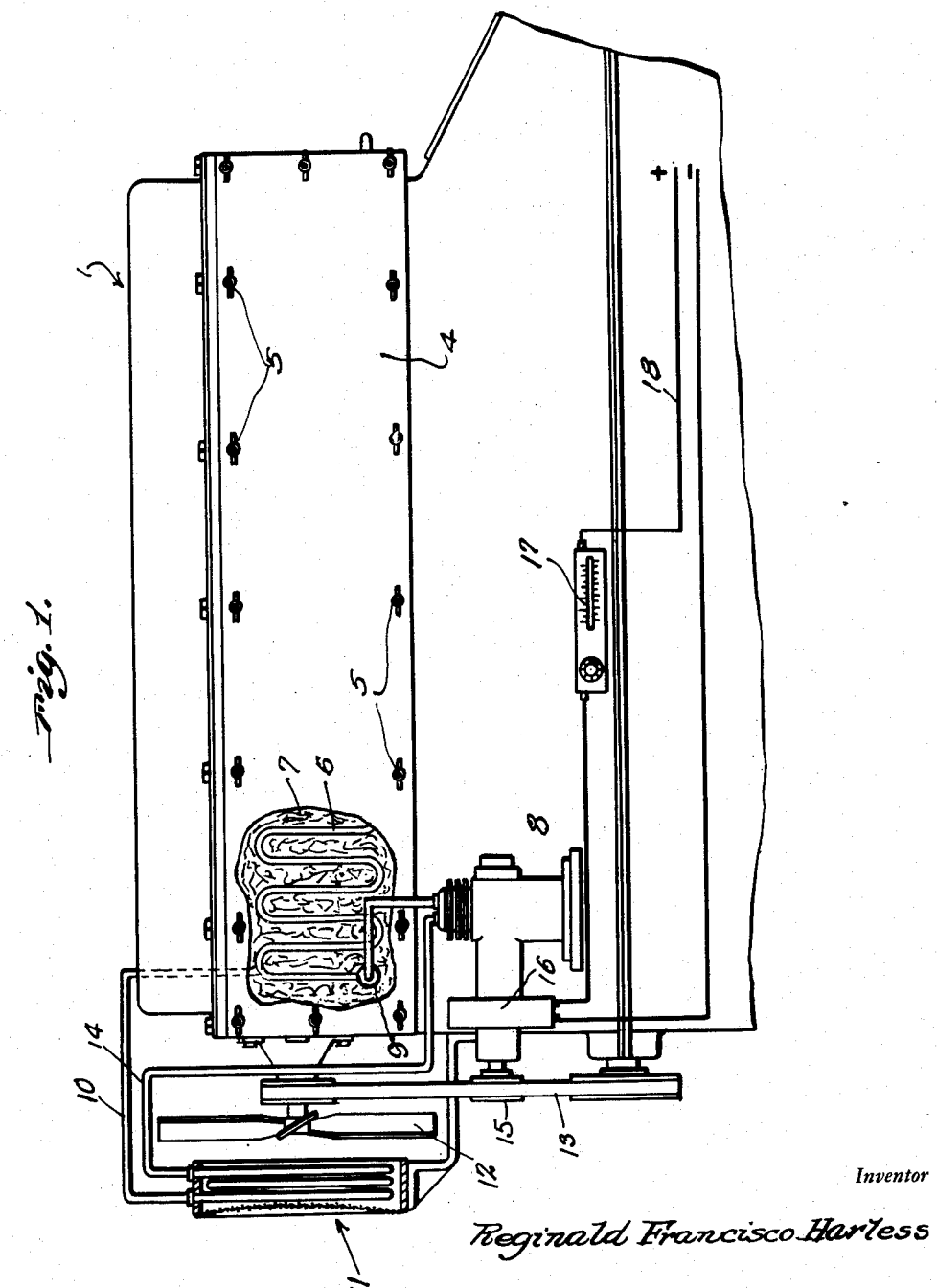

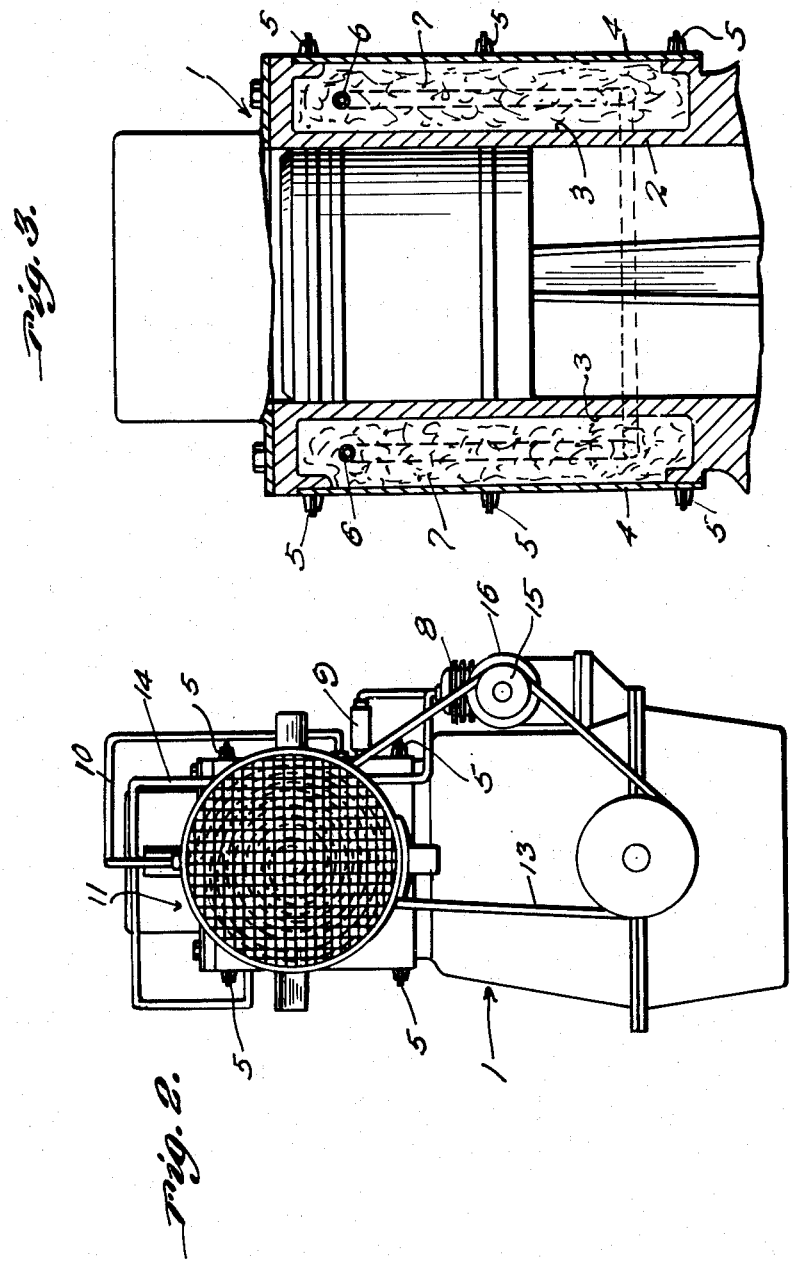

2,344,865

UNITED STATES PATENT OFFICE 2,344,865

INTERNAL COMBUSTION ENGINE

Reginald Francisco Harless, Ossining, N. Y.

Application April 24, 1943, Serial No. 484,422

2 Claims. (Cl. 123—170)

The present invention relates generally to new and useful improvements in internal combustion engines and has for its primary object to provide a system of thermostatic reciprocable exchange, in a manner as hereinafter set forth, a device of this character comprising novel means in the form of a mechanical refrigerating apparatus for uniformly cooling the entire cylinder block and maintaining a constant temperature under all conditions when the engine is in operation, thereby increasing the efficiency and prolonging the life of said engine.

Other objects of the invention are to provide a cooling system for internal combustion engines which will be comparatively simple in construction, strong, durable, reliable, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of an internal combustion engine embodying a cooling system in accordance with the present invention, showing a portion of the removable access plate broken away.

Figure 2 is a view in front elevation thereof.

Figure 3 is a view in cross section through the upper portion of the cylinder block.

Referring now to the drawings in detail, it will be seen that reference numeral 1 designates generally an internal combustion engine comprising an "in line" cylinder block 2. The walls of the cylinder block 2 are formed to provide longitudinally elongated chambers 3. Access plates 4, secured by wing nuts 5, close the chambers 3.

The chambers 3 are for the reception of copper coils 6 which are connected at one end around the rear of the block 2. Bronze wool 7 is packed in the chambers 3 around the coils 6 for uniformly conducting the heat to said coils.

Mounted on one side of the engine 1, adjacent the front thereof, is a pump 8. The discharge side of the pump 8 is connected to an expansion valve 9 to which the other end of the adjacent coil 6 is connected.

The coil 6 on the side of the engine which is remote the pump 8 has one end connected by a tube 10 to a heat expansion coil 11, which is mounted forwardly of said engine. A suction fan 12 is mounted on the front of the engine 1 in back of the expansion coil 11 for drawing air therethrough. A belt 13 drives the fan 12 from the crankshaft of the engine 1 in the usual manner. A return tube 14 connects the expansion coil 11 to the intake side of the refrigeration pump 8.

The fan belt 13 also drives a pulley 15 for actuating the pump 8. The pulley 15 is releasably connected to the pump 8 by means including a magnetic clutch 16. An adjustable automatic thermostatic control switch 17 is interposed in the electric circuit 18 of the clutch 16.

It is thought that the operation of the cooling system will be readily apparent from a consideration of the foregoing. With the control 17 set to function at 190 degrees, for example, the engine is started and the cooling system remains inoperative until said engine reaches that temperature. When the engine reaches the aforementioned predetermined temperature, the control 17 closes the electric circuit to the magnetic clutch 16 for operatively connecting the running pulley 15 to the pump 8. Thus, the refrigerant is caused to flow in the usual manner through the expansion valve 9, the coils 6 where the heat from the block 2 is absorbed, the tube 10, the expansion coil 11 and thence through the return tube 14 to the pump.

It is believed that the many advantages of an internal combustion engine comprising a cooling system constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

Having described the invention, what is claimed as new is:

1. An internal combustion engine comprising a cylinder block including side walls having longitudinally elongated chambers therein, removable access plates closing the chambers, cooling coils mounted in the chambers, a metallic wool packed in the chambers around the coils, and means for circulating a refrigerant through the coils.

2. In combination, an internal combustion engine comprising a cylinder block, a cooling coil mounted in the walls of said block, said coils for the reception of a refrigerant, a pump connected to one end of the coils, an expansion coil mounted forwardly of the engine, one side of said expansion coil being connected to the other end of the first-named coil and the other side of said expansion coil being connected to the intake side of the pump, a suction fan mounted in the engine in back of the expansion coil, a belt driving the fan, a pulley engaged with the belt for actuation thereby, means including a magnetic clutch for releasably connecting the pump to said pulley, an electric circuit connecting the magnetic clutch to a source of current, and a thermostatic control, responsive to the temperature of the engine, interposed in said circuit.

REGINALD FRANCISCO HARLESS.